(12) United States Patent
Hotchkiss et al.

(10) Patent No.: US 12,544,700 B2
(45) Date of Patent: Feb. 10, 2026

(54) TREATMENT OF PARTICULATE FILTERS (71) Applicant: Johnson Matthey Public Limited Company, London (GB)

(72) Inventors: Thomas Hotchkiss, Royston (GB); Jordan Nisbet, Royston (GB); Craig Thomson, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 18/777,569

(22) Filed: Jul. 19, 2024

(65) Prior Publication Data
US 2025/0041776 A1    Feb. 6, 2025

Related U.S. Application Data

(60) Provisional application No. 63/517,118, filed on Aug. 2, 2023.

(51) Int. Cl.
*B01D 46/00*    (2022.01)
*B01D 39/20*    (2006.01)
(Continued)

(52) U.S. Cl.
CPC ..... *B01D 46/0001* (2013.01); *B01D 39/2027* (2013.01); *B01D 53/94* (2013.01);
(Continued)

(58) Field of Classification Search
CPC ........ B01D 46/0001; B01D 39/2027; B01D 53/94; B01J 35/36; B01J 37/0225; C23C 24/04
See application file for complete search history.

(56) References Cited

U.S. PATENT DOCUMENTS 11,192,793 B2    12/2021    Kilmartin
2021/0301695 A1    9/2021    Sendo
(Continued)

FOREIGN PATENT DOCUMENTS

EP    2371451 A1    10/2011
EP    4013954 A1    6/2022
(Continued)

*Primary Examiner* — Nathan T Leong (57) ABSTRACT

A method and apparatus for applying a dry powder to a porous substrate (10) comprising:
   a) locating the porous substrate (10) in a holder (2) such that an inlet face (11) is in communication with an inlet chamber (15) and an outlet face (12) is in communication with a vacuum generator;
   b) establishing a primary gas flow through the porous substrate (10) using the vacuum generator to apply a pressure reduction to the outlet face (12);
   c) spraying the dry powder into or within the inlet chamber (15) such that dry powder is entrained in the primary gas flow and passes through the inlet face (11) of the porous substrate (10) to contact a porous structure (13) of the porous substrate (10);
   d) during the spraying of the dry powder directing a secondary gas flow onto and/or across the inlet face of the porous substrate (10); and
   e) using a pressure and/or a flow rate of the secondary gas flow to control an axial distribution of the dry powder that is deposited in the porous structure (13) of the porous substrate (10).

11 Claims, 5 Drawing Sheets

(51) Int. Cl.
*B01D 53/94* (2006.01)
*B01J 35/56* (2024.01)
*B01J 37/02* (2006.01)
*C23C 24/04* (2006.01)

(52) U.S. Cl.
CPC .......... *B01J 35/56* (2024.01); *B01J 37/0225* (2013.01); *C23C 24/04* (2013.01); *B01D 2239/10* (2013.01); *B01D 2255/9155* (2013.01); *B01D 2258/01* (2013.01); *B01D 2279/30* (2013.01)

(56) References Cited

U.S. PATENT DOCUMENTS

2022/0111376 A1* 4/2022 Bellham .............. B01D 53/945
2023/0076492 A1   3/2023 Arulraj

FOREIGN PATENT DOCUMENTS

| WO | 2021/028691 A1 | 2/2021 |
| WO | 2024107349 A1 | 5/2024 |
| WO | 2024113256 A1 | 6/2024 |

* cited by examiner

TREATMENT OF PARTICULATE FILTERS

The present disclosure relates to methods and apparatus for applying a dry powder to a porous substrate. In some embodiments the invention relates to improvements in methods and apparatus for coating a filter comprising a porous substrate having an inlet face and an outlet face, wherein the inlet face is separated from the outlet face by a porous structure. The filter may be a wall-flow filter.

BACKGROUND TO THE DISCLOSURE

EP 4013954 A1 describes a method and apparatus for treating a filter for filtering particulate matter from exhaust gas, the method comprising the steps of: a) containing a dry powder in a reservoir; b) locating a filter in a filter holder, the filter comprising a porous substrate having an inlet face and an outlet face, the inlet face and the outlet face being separated by a porous structure; c) establishing a primary gas flow through the porous structure of the filter by applying a pressure reduction to the outlet face of the filter; d) transferring the dry powder from the reservoir to a spray device located upstream of the inlet face of the filter; and e) spraying the dry powder, using the spray device, towards the inlet face of the filter such that the dry powder is entrained in the primary gas flow and passes through the inlet face of the filter to contact the porous structure.

While the method and apparatus have proved effective at loading dry powder into the porous structure there remains a need for optimisation of the loading of dry powder into such porous structures. For example, the amount and location of the dry powder within the porous structure may affect the backpressure, soot location during operation, and in some cases the filtration efficiency of the porous substrate.

SUMMARY OF THE DISCLOSURE

In a first aspect the present disclosure provides a method of applying a dry powder to a porous substrate, the porous substrate having an inlet face at an inlet end and an outlet face at an outlet end with the inlet face and the outlet face being separated by a porous structure, the method comprising the steps of:
a) locating the porous substrate in a holder such that the inlet face is in communication with an inlet chamber and the outlet face is in communication with a vacuum generator;
b) establishing a primary gas flow through the porous substrate from the inlet face to the outlet face by using the vacuum generator to apply a pressure reduction to the outlet face of the porous substrate;
c) spraying the dry powder into or within the inlet chamber such that dry powder is entrained in the primary gas flow and passes through the inlet face of the porous substrate to contact the porous structure;
d) during the spraying of the dry powder directing a secondary gas flow onto and/or across the inlet face of the porous substrate; and
e) using a pressure and/or a flow rate of the secondary gas flow to control an axial distribution of the dry powder that is deposited in the porous structure of the porous substrate.

Controlling the axial distribution of the dry powder may comprise:
selecting a relatively high pressure and/or flow rate of the secondary gas flow to skew the axial distribution of the dry powder that is deposited in the porous structure towards the inlet end of the porous substrate;
selecting a relatively low pressure and/or flow rate of the secondary gas flow or deactivating the secondary gas flow to skew the axial distribution of the dry powder that is deposited in the porous structure towards the outlet end of the porous substrate; and
selecting a relatively intermediate pressure and/or flow rate of the secondary gas flow to obtain an intermediate axial distribution of the dry powder that is deposited in the porous structure.

Without wishing to be bound by theory, it is believed that the momentum of the particles of dry powder imparted by the primary gas flow (and also potentially by the means of spraying) tends to carry the dry powder preferentially towards the outlet end of the porous substrate. The secondary gas flow is believed to create a localised turbulent zone at or above the inlet face that reduces said momentum and/or imparts a transverse component to the momentum that has the effect of skewing the axial distribution of the dry powder that is deposited towards the inlet end of the porous substrate.

Advantageously, the method allows the axial deposition of the dry powder to be controlled in a straightforward and repeatable manner. In this way the backpressure, soot location during operation, and in some cases the filtration efficiency of the porous substrate may be more controllable than with prior art solutions.

The secondary gas flow may be active for:
an entire duration of the spraying of the dry powder; or
a portion of the duration of the spraying of the dry powder.

The duration and timing of the activation of the secondary gas flow may be used to fine tune the location of the deposition of the dry powder.

The secondary gas flow may remain active or be activated after the spraying of the dry powder has ceased in order to blow off dry powder accumulated on the inlet face of the porous substrate. The vacuum generator may remain active during activation of the secondary gas flow after cessation of spraying of the dry powder such that the dry powder blown off the inlet face is entrained in the primary gas flow and passes through the inlet face of the porous substrate.

Advantageously, use of the secondary gas flow provides a practical, easy to operate and low maintenance means for cleaning the inlet face of the porous substrate. The secondary gas flow may not require any electrical power in use and does not cause any obstruction to the gas flow as it approaches the inlet face. Beneficially, keeping the vacuum generator active during operation of the secondary gas flow increases the utilisation of the dry powder by causing the dry powder to enter through the inlet face into the porous structure. Beneficially the same source of the secondary gas flow may be used for both controlling the location of deposition of the dry powder within the porous substrate and for cleaning the inlet face.

The secondary gas flow may be configured to be a 360° or substantially 360° flow of gas.

The secondary gas flow may be configured to be directed at a downwards angle onto the inlet face.

The method may further comprise using a ring air blade to generate the secondary gas flow. The ring air blade may be orientated to direct a gas flow at a downward angle onto the inlet face of the porous substrate. For example, the ring air blade may comprise a shaped outlet that uses the Coanda effect to deflect a radially-inward flow of gas downward to produce a conical flow of gas that may be directed towards the inlet face. The ring air blade may emit a 360° or substantially 360° flow of gas. In some embodiments the ring air blade may comprise two semi-circular elements each supplied by a gas inlet. When the two elements are conjoined a complete ring encompassing the inlet face may be formed. Where two elements are used the outlet opening may not extend completing for 360° due to the presence of end walls. However, it will be appreciated that the gas flow emitted will still extend around approximately 360°.

The source of the secondary gas flow, for example the ring air blade, may be located within the inlet chamber or between the inlet chamber and the inlet face of the porous substrate or arranged in series between portions of the inlet chamber. In some embodiments the source may be smaller in outer diameter than the inlet chamber and be located concentrically within the inlet chamber. In other embodiments the source may have a similar outer diameter size to that of the inlet chamber and may be stacked in series between the inlet chamber and the inlet face of the porous substrate.

The inlet chamber may be, for example, a tube, optionally with an open upper end. A lower end of the tube may be in fluid communication with the inlet face of the porous substrate.

The secondary gas flow may be supplied at a pressure of up to 8 bar, optionally at 1 to 8 bar, optionally at 1 to 6 bar, optionally at 1, 2, 3, 4, 5, 6, 7 or 8 bar.

The source of the secondary gas flow, for example the ring air blade, may emit gas at a flow rate of up to 150 litres per minute, optionally up to 200 litres per minute, optionally up to 250 litres per minute.

The dry powder may be sprayed into or within the inlet chamber using a spray device, optionally a spray nozzle. The spray nozzle may use a flow of gas to entrain the dry powder during spraying. For example, the spray device may comprise a compressed air gun. A non-limiting example of a suitable compressed air gun is the STAR Professional gravity feed spray gun 1.4 mm, part no. STA2591100C.

When using the pressure and/or the flow rate of the secondary gas flow to control the axial distribution of the dry powder, a spatial separation of the spray device, for example spray nozzle, from the inlet face may remain fixed. Advantageously, the method may permit the use of a fixed spray device, for example a fixed spray nozzle, while allowing the location of the deposition of the dry powder to be varied. This avoids the time delays and costs of needing to modify the apparatus to change the location of the spray device when changing the size or type of porous substrate being treated.

The spray device may be located at a distance of 100 cm or more from the inlet face, optionally at a distance of 150 cm or more, optionally at a distance of 200 cm or more. Advantageously, locating the spray device at such distances permits the dry powder be coated onto porous substrates having relatively large diameter inlet faces, which would not be possible if the spray device was positioned too close to the inlet face. According to the present method the relatively large spacing of the spray device from the inlet face (potentially leading to a relatively high momentum of the dry powder particles) may be accommodated by controlling the pressure and/or flow rate of the secondary gas flow to still permit an inlet end-skewed axial distribution of the dry powder that is deposited to be achieved.

The gas flow generated by the vacuum generator may be a flow of air or other suitable gas. The secondary gas flow may be a pressurised flow of air or other suitable gas.

The method may further comprise applying dry powder successively to a plurality of porous substrates, wherein for each of the plurality of porous substrates the pressure and/or flow rate of the secondary gas flow is selected in order to control the axial distribution of the dry powder that is deposited in the porous structure of that porous substrate. Advantageously, the plurality of porous substrates (which may be of different types and sizes) may be accommodated simply by selecting an appropriate pressure and/or flow rate of the secondary gas flow. In particular, it may be possible to treat different porous substrates without having to individualise the primary gas flow or spatial separation of the spray device from the inlet face for each porous substrate. This may result in a simpler and faster treatment cycle.

A spatial separation of a spray nozzle for spraying the dry powder and the inlet face of the plurality of porous substrates may remain fixed.

In a second aspect the present disclosure provides an apparatus for applying a dry powder to a porous substrate, the porous substrate having an inlet face at an inlet end and an outlet face at an outlet end with the inlet face and the outlet face being separated by a porous structure, the apparatus comprising:

a) a holder for holding the porous substrate;
b) an inlet chamber in communication with the inlet face;
c) a vacuum generator in communication with the outlet face for establishing a primary gas flow through the porous substrate from the inlet face to the outlet face;
d) a spray device for spraying the dry powder into or within the inlet chamber; and
e) a secondary gas source for establishing a secondary gas flow onto and/or across the inlet face of the porous substrate; and
f) a controller for selecting a pressure and/or a flow rate of the secondary gas flow to control an axial distribution of the dry powder that is deposited in the porous structure of the porous substrate.

As noted above, the secondary gas source may be orientated to direct a gas flow at a downward angle onto the inlet face of the porous substrate. The secondary gas source may be configured to emit a 360° or substantially 360° flow of gas. The secondary gas source may be a ring air blade. The plane of a gas outlet of the ring air blade may be positioned between 1 and 10 cm above the plane of the inlet face. The ring air blade may be located within the inlet chamber or between the inlet chamber and the inlet face of the porous substrate.

In this specification the term "dry powder" refers to a particulate composition that is not suspended or dissolved in a liquid. It is not meant to necessarily imply a complete absence of all water molecules. The dry powder is preferably free-flowing.

In some embodiments the dry powder may comprise or consist of a silicone resin. Silicone resins are known and are branched, cagelike oligosiloxanes and polysiloxanes. The branching in silicone resins results from the presence of so called "T" and/or "Q" units in the resin which refer to $RSiO_3$ and $SiO_4$ units (R is an alkyl or aryl group), respectively, wherein further silicon units are bonded to the oxygen atoms. "M" units, i.e., $R_3SiO$ unit are terminal units wherein the oxygen atom provides a link to the resin backbone. Similarly, "D" units, i.e., $R_2SiO_2$ units provide linear connectivity across the two oxygen atoms. One well known nonbranched and linear polysiloxane is polydimethylsiloxane (PDMS; i.e., $(Me_2SiO)_n$).

Preferably, the silicone resin is a solid at room temperature (e.g., about 25° C.). Accordingly, the silicone resin preferably has a melting point of greater than 25° C., preferably greater than 30° C., more preferably greater than 35° C. Preferably, the melting point of the silicone resin is less than 100° C., preferably less than 95° C., less than 90° C., less than 85° C. or less than 80° C. Non-branched polysiloxanes such as PDMS typically have lower melting points than silicone resins which are branched. For example, the melting point of PDMS is about −40° C. WO 2011/151711 discloses binding powder in place by treatment with polydimethylsiloxane which forms silica when hydrolysed at sufficiently high temperature.

Similarly, it may be preferable that the silicone resin has a glass transition temperature (Tg) of greater than 30° C., preferably greater than 35° C., and/or less than 100° C., preferably less than 80° C. Without wishing to be bound by theory, it is believed that silicone resins which have such melting points and/or glass transition temperatures are particularly suited for the powder coating process, i.e., for effective particulate dispersion across the porous substrate, yet low enough to permit low temperature calcination thereby effectively and efficiently adhering inorganic particles to gas contacting surfaces of the channel walls of the porous substrate.

Preferably, the silicone resin has a molecular weight of greater than 1,000, preferably greater than 2,000, preferably greater than 5,000, preferably greater than 10,000, and/or a molecular weight of less than 500,000, preferably less than 200,000.

As used herein, molecular weight refers to the weight average molecular weight ($M_w$) which may be measured using any conventional means in the art. In some embodiments, the molecular weight may be relatively low since the hydrogen bonding provided by hydroxy functionalities provides the silicone resin with a sufficiently high melting point and/or glass transition temperature. Accordingly, in some embodiments the molecular weight of the silicon resin may be from 1,000 to 10,000, preferably from 1,000 to 5,000, preferably from 1,200 to 3,500, such as from 1,500 to 2,000. Silicone resins having molecular weights below 1,000 are less preferred since they are typically either liquid and not suitable for dry spraying or do not have as much branching as larger molecules which is believed to provide enhanced binding of the inorganic particles to the porous substrate.

Nevertheless, the molecular weight of the silicone resin may preferably be from 15,000 to 150,000, preferably from 20,000 to 120,000, preferably from 60,000 to 100,000. Some preferable resins have an $M_w$ of from 8,000 to 15,000, some from 20,000 to 60,000 and others from 80,000 to 120,000.

It is particularly preferred that the silicone resin has the formula $[R_xSiX_yO_z]_n$, wherein R is an alkyl or aryl group, X is a functional group bonded to silicon, and wherein z is more than 1 and less than 2. As will be appreciated, n is large so as to provide an oligomer or polymer necessary for a silicone resin, particularly a resin which is solid at room temperature. Whilst dependent on the molecular mass of the R and X groups, an $M_w$ of greater than 1,000 may be achieved where n is greater than 10, an $M_w$ of greater than 10,000 may be achieved where n is greater than 100 and an $M_w$ of greater than 100,000 may be achieved where n is greater than 1,000. Accordingly, n may preferably be greater than 10, greater than 100, greater than 1,000.

As will be appreciated, R is an alkyl or an aryl bonded to silicon and X is a non-hydrocarbon functional group bonded to silicon. Equally, since silicon is a tetravalent atom, it will be appreciated that x+y+2z=4. z is less than 2 since where z=2, x and y=0 providing silica (i.e., silicon dioxide; $(SiO_2)_n$). Similarly, z is greater than 1 since where z=1, x+y=2 providing a substituted polysiloxane (e.g. $(RXSiO)_n$) consisting of "D" units providing a linear resin (e.g. —O—(SiRX)—O—(SiRX)—O—). One example is polydimethylsiloxane. Accordingly, O refers to oxygen bridging two silicon atoms in the polymeric backbone of the silicone resin.

Preferably, 0<x+y<2, preferably 0<x+y≤1.5, preferably 0<x+y≤1. Preferably, x, y and/or x+y is greater than 0.1, preferably greater than 0.2. In one preferred embodiment, x+y is 1 providing a silicone resin known generally as a polysilsesquioxane. Preferably, y is less than 1 and/or y is less than x. Even more preferably, 2y≤x, preferably 5y≤x, preferably 10y≤x. In one embodiment, y is 0. For example, y is 0 where the polysilsesquioxane is a polyalkylsilsesquioxane such as polymethylsilsesquioxane $(MeSiO_{3/2})_n$.

Typically, where present, X is one or more of H, hydroxy (OH), Cl and $C_1$-$C_6$ alkoxy, preferably one or more of OH and $C_1$-$C_6$ alkoxy, preferably wherein the $C_1$-$C_6$ alkoxy is selected from methoxy ($OCH_3$) and ethoxy ($OCH_2CH_3$). In a particularly preferred embodiment, X is one or both of OH and ethoxy. However, X is a functional group which can also be a reactive functional group such as aminyl ($NH_2$, $NR_2$), epoxy, acrylate, and vinyl, though these are less preferred since the presence of hydroxy or alkoxy groups is believed to provide more effective cross-linking during calcination. As described above, any oxygen present in the terminal functional group does not contribute to "$O_z$" in the above formula which refers to silicon bridging oxygen atoms.

In some embodiments the dry powder may comprise or consist of a zeolite. Zeolites are structures formed from alumina and silica and the SAR determines the reactive sites within the zeolite structure. The zeolite may be a small pore zeolite (e.g. a zeolite having a maximum ring size of eight tetrahedral atoms), a medium pore zeolite (e.g. a zeolite having a maximum ring size of ten tetrahedral atoms) or a large pore zeolite (e.g. a zeolite having a maximum ring size of twelve tetrahedral atoms) or a combination of two or more thereof.

Examples of suitable zeolites include silicate zeolite, aluminosilicate zeolite, metal-substituted aluminosilicate zeolite, AlPO, MeAlPO, SAPO, MeAPSO, and the like. In some embodiments, the zeolites are selected from aluminosilicate, borosilicate, gallosilicate, SAPO, AlPO, MeAPSO, and MeAPO zeolites.

When the zeolite is a small pore zeolite, then the small pore zeolite may have a framework structure represented by a Framework Type Code (FTC) selected from the group comprising (e.g. consisting of) ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or combination and/or an intergrowth of two or more thereof. In some embodiments, the small pore zeolite has a framework structure selected from the group comprising (e.g. consisting of) CHA, LEV, AEI, AFX, ERI, LTA, SFW, KFI, DDR and ITE. In some embodiments, the small pore zeolite has a framework structure selected from the group comprising (e.g. consisting of) CHA and AEI. The small pore zeolite may have a CHA framework structure.

When the zeolite is a medium pore zeolite, then the medium pore zeolite may have a framework structure represented by a Framework Type Code (FTC) selected from the group comprising (e.g. consisting of) AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI and WEN, or a mixture and/or an intergrowth of two or more thereof. In some embodiments, the medium pore zeolite has a framework structure selected from the group comprising (e.g. consisting of) FER, MEL, MFI, and STT. In some embodiments, the medium pore zeolite has a framework structure selected from the group comprising (e.g. consisting of) FER and MFI, particularly MFI. When the medium pore molecular sieve has a FER or MFI framework, then the zeolite may be ferrierite, silicalite or ZSM-5.

When the zeolite is a large pore zeolite, then the large pore zeolite may have a framework structure represented by a Framework Type Code (FTC) selected from the group comprising (e.g. consisting of) AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEl, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. In some embodiments, the large pore zeolite has a framework structure selected from the group comprising (e.g. consisting of) AFI, BEA, MAZ, MOR, and OFF. In some embodiments, the large pore zeolite has a framework structure selected from the group comprising (e.g. consisting of) BEA, MOR and FAU. When the large pore molecular has a framework structure of FTC BEA, FAU or MOR, then the zeolite may be a beta zeolite, faujasite, zeolite Y, zeolite X or mordenite.

In some embodiments, the zeolite has a framework type selected from ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEl, EMT, EON, EPI, ERI, ESV, ETR, EUO, FAU, FER, FRA, GIS, GIU, GME, GON, GOO, HEU, IFR, IFY, IHW, IRN, ISV, ITE, ITH, ITW, IWR, IWW, JBW, KFI, LAU, LEV, LIO, LIT, LOS, LOV, LTA, LTL, LTN, MAR, MAZ, MEl, MEL, MEP, MER, MFI, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, WI, VNI, VSV, WIE, WEN, YUG, ZON, or combinations thereof. In some embodiments, the zeolite has a framework type selected from AEI, AFT, AFV, AFX, AVL, BEA, CHA, DDR, EAB, EEl, ERI, FAU, FER, IFY, IRN, KFI, LEV, LTA, LTN, MER, MOR, MWF, MFI, NPT, PAU, RHO, RIE, RTH, SAS, SAT, SAV, SFW, TSC, and UFI.

In another embodiment, the inorganic particles are refractory oxide particles which can be based on an oxide selected from the group consisting of alumina, silica, zirconia, ceria, chromia, magnesia, calcia, titania and mixed oxides of any two or more thereof. Preferably, the refractory oxide particles comprise calcium aluminate, fumed alumina, fumed silica, fumed titania, fumed zirconia, fumed ceria, alumina aerogel, silica aerogel, titania aerogel, zirconia aerogel, ceria aerogel or a mixture thereof. The one or more fumed refractory powders (refractory oxide particles) may be produced by a pyrogenic process, for example flame pyrolysis.

In some embodiments the dry powder may comprise or consist of a metal compound for forming by thermal decomposition a metal oxide. The dry powder may consist of a single metal compound of may consist of a mixture or blend or successive doses of two or more metal compounds. The or each metal compound may contain one or more metal cations. Where a plurality of metal cations is present these may be of the same or of different metals. The metal compound may comprise or consist of a metal hydroxide, a metal phosphate, a metal carbonate, a metal sulphate, a metal perchlorate, a metal iodide, a metal oxalate, a metal acetate, a metal chlorate or a mixture thereof. The metal of the metal compound may comprise or consist of one or more of magnesium, calcium, strontium, barium, aluminium, zirconium, manganese, lithium, iron, cobalt, nickel, copper, or gallium. The dry powder may additionally comprise a metal oxide or mixed metal oxide. Optionally the dry powder comprises 90 wt % or greater of the metal compound for forming by thermal decomposition a metal oxide and 10 wt % or less of the metal oxide or mixed metal oxide. Optionally the dry powder comprises 95 wt % or greater of the metal compound for forming by thermal decomposition a metal oxide and 5 wt % or less of the metal oxide or mixed metal oxide. Optionally the dry powder comprises 99 wt % or greater of the metal compound for forming by thermal decomposition a metal oxide and 1 wt % or less of the metal oxide or mixed metal oxide. The metal of the metal oxide or mixed metal oxide may comprise or consist of one or more of aluminium, magnesium, calcium, strontium, barium, aluminium, zirconium, manganese, lithium, iron, cobalt, nickel, copper, or gallium. Optionally the dry powder comprises or consists of a metal hydroxide, a metal phosphate, a metal carbonate or a mixture thereof. The metal hydroxide may be selected from the group consisting of magnesium hydroxide, calcium hydroxide, strontium hydroxide and barium hydroxide. The metal phosphate may be selected from the group consisting of magnesium phosphate, calcium phosphate, strontium phosphate and barium phosphate. The metal carbonate may be selected from the group consisting of magnesium carbonate, calcium carbonate, strontium carbonate and barium carbonate.

The dry powder may consist of a single powder type or a mixture of powder types. For example the dry powder may comprise or consist of a mixture of zeolite and silicone resin.

The porous substrate may, for example, a through-flow monolith or a filter. In this specification the term "filter" refers to a porous substrate that has a porous structure suitable for filtering particulate matter from exhaust gas. The porous substrate may be formed for example from sintered metal, ceramic or metal fibres etc. The filter may be of the wall-flow kind made from porous material, for example ceramic, fabricated in the form of a monolithic array of many small channels running along the length of the body. For example, the filter may be formed from cordierite, various forms of silicon carbide or aluminium titanate.

The filter may be a "bare" filter or alternatively may be one with an incorporated catalytic function ability such as oxidation, NOx-trapping, or selective catalytic reduction activity. The porous substrate may comprise a composition (known as a washcoat) that coats the porous structure of the filter. The washcoat may be a catalytic washcoat. The catalytic washcoat may comprise a catalyst, selected from the group consisting of a hydrocarbon trap, a three-way catalyst (TWC), a NOx absorber, an oxidation catalyst, a selective catalytic reduction (SCR) catalyst, a lean NOx catalyst and combinations of any two or more thereof. The catalyst, for example the TWC, NOx absorber, oxidation catalyst, hydrocarbon trap and the lean NOx catalyst, may contain one or more platinum group metals, particularly those selected from the group consisting of platinum, palladium and rhodium.

The filter may, for example, be a diesel particulate filter (DPF), a catalysed soot filter (CSF), a selective catalytic reduction filter (SCRF), a lean NOx trap filter (LNTF), a gasoline particulate filter (GPF), an ammonia slip catalyst filter (ASCF), or a combination of two or more thereof (e.g. a filter comprising a selective catalytic reduction (SCR) catalyst and an ammonia slip catalyst (ASC).

The shape and dimensions of the filter, for example properties such as the channel wall thickness and its porosity etc. may be varied depending on the intended application for the filter. The filter may be configured for use with an internal combustion engine to filter the exhaust gas emitted by the internal combustion engine. The internal combustion engine may be a gasoline spark ignition engine. However, the filter finds particular application when configured for use with an internal combustion engine in the form of a diesel or gasoline engine.

In this specification the terms "inlet" and "outlet" refer to the orientation of the porous substrate when subject to the primary gas flow created by the vacuum generator with the flow of gas being from the inlet face or inlet end towards the outlet face or outlet end. It will be understood that the porous substrate may adopt other orientations in subsequent treatment steps or use, for example when used in a vehicle to treat exhaust gases. For example, exhaust gas flow in use through the porous substrate may be from the "inlet" to the "outlet" or vice versa.

In this specification the term "vacuum generator" refers to an apparatus or combination of apparatus that function to produce a pressure reduction. Non-limiting examples of suitable apparatus include vacuum generators that operate on the venturi principle, vacuum pumps, for example rotary vane and liquid ring vacuum pumps, and regenerative blowers.

In this specification the term "controller" may refer to a function that may comprise hardware and/or software. The controller may comprise a control unit or may be a computer program running on a dedicated or shared computing resource. The controller may comprise a single unit or may be composed of a plurality of sub-units that are operatively connected. The controller may be located on one processing resource or may be distributed across spatially separate processing resources. The controller may comprise a microcontroller, one or more processors (such as one or more microprocessors), memory, configurable logic, firmware, etc.

BRIEF DESCRIPTION OF THE DRAWINGS

Aspects and embodiments of the present disclosure will now be described, by way of example only, with reference to the accompanying drawings, in which.

DETAILED DESCRIPTION

The skilled reader will recognise that one or more features of one aspect or embodiment of the present disclosure may be combined with one or more features of any other aspect or embodiment of the present disclosure unless the immediate context teaches otherwise.

An example of an apparatus in accordance with the present disclosure will now be described with reference to FIG. 1 which shows a schematic diagram of an apparatus 1 for treating a porous substrate 10 for filtering particulate matter from exhaust gas. The porous substrate 10 is of a type having an inlet face 11 and an outlet face 12, the inlet face 11 and the outlet face 12 being separated by a porous structure 13.

The apparatus 1 comprises a holder 2 for holding the porous substrate 10, an inlet chamber 15 in communication with the inlet face 11, a vacuum generator in communication with the outlet face 12 for establishing a primary gas flow through the porous substrate 10 from the inlet face 11 to the outlet face 12, a spray device for spraying dry powder into or within the inlet chamber 15 and a secondary gas source for producing a secondary gas flow, shown by way of example in the form of a ring air blade 30.

The holder 2 may comprise means for holding securely the porous substrate 10. The holder 2 may comprise an upper inflatable collar 3 supplied by inflation line 5 and a lower inflatable collar 4 supplied by inflation line 6.

The vacuum generator may comprise a vacuum cone 17 connected via a line 16 to, for example, a regenerative blower.

The spray device may comprise a spray nozzle 20 supplied with dry powder along a powder supply line 21, for example by gravity feed. A gas feed line 22 may supply compressed gas, e.g. compressed air, to the spray nozzle 20 for entraining, mobilising and spraying the dry powder out of the spray nozzle 20. The spray nozzle 20 may be located within the inlet chamber 15 as shown in FIG. 1 or alternatively located outside the inlet chamber 15 but orientated to spray the dry powder into the inlet chamber 15.

The spray device may be located at a distance, h, of 100 cm or more from the inlet face 11, optionally at a distance of 150 cm or more, optionally at a distance of 200 cm or more. The distance, h, may be fixed for a particular apparatus 1.

The inlet chamber 15 may comprise a tube 15 having, optionally, an open upper end. The tube 15 may have a shape conformal to the shape of the inlet face 11 and a size that is equal to or large than the inlet face 11.

Figure 1:
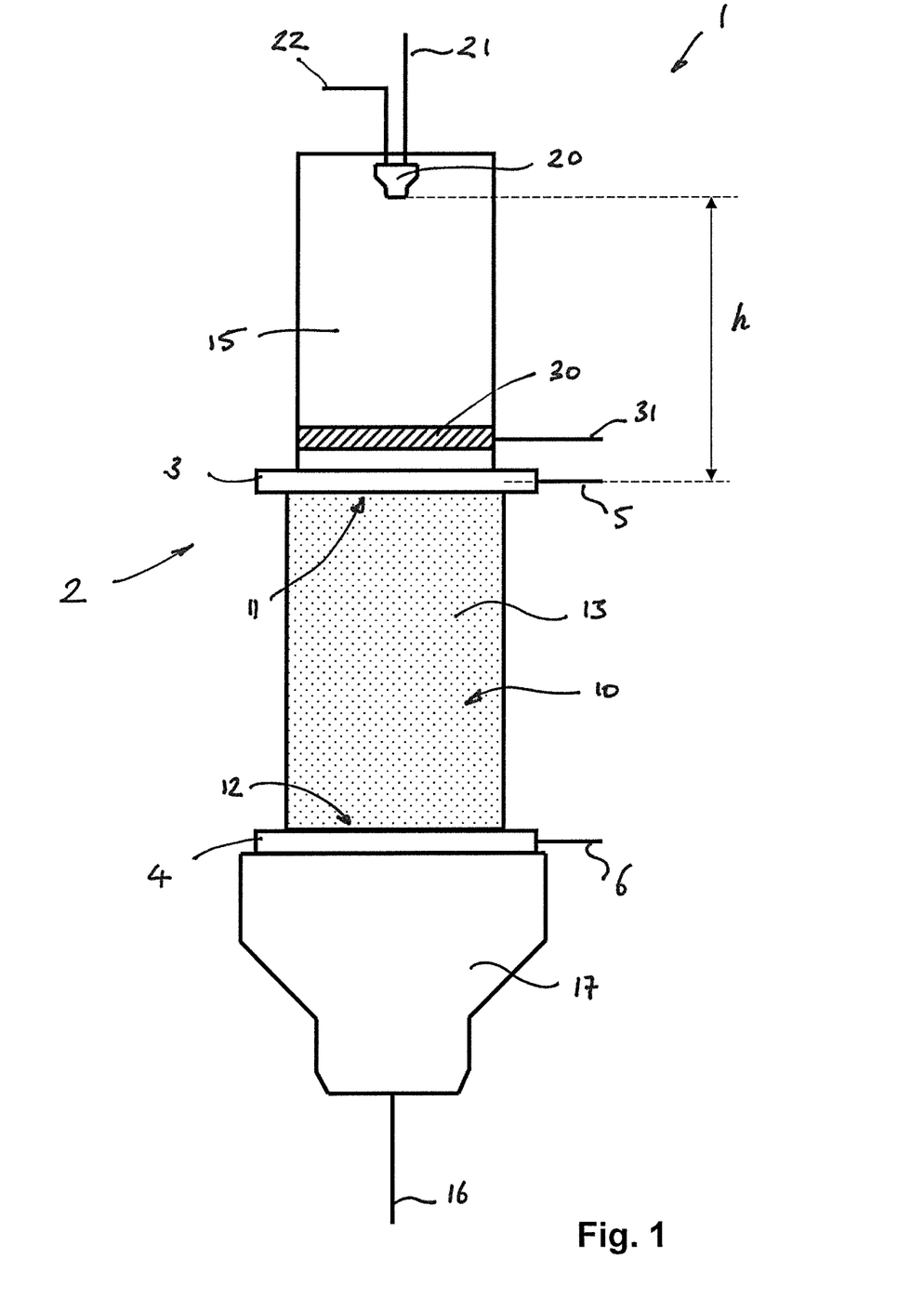
FIG. 1 is a schematic illustration of an apparatus according to the present disclosure.

The secondary gas source, e.g. ring air blade 30, may be located within the inlet chamber 15 as shown in FIG. 1 or may be arranged in series with one or more portions of the inlet chamber 15 or located between the inlet chamber 15 and the inlet face 11. A gas supply 31 feeds pressurised gas, for example air, to the ring air blade 30.

A controller may be provided for selecting a pressure and/or a flow rate of the secondary gas flow generated by the secondary gas source. For example the controller may be an electronic and/or software control operatively connected to a valve and or pump. Alternatively, the controller may be a manual control for setting the pressure and/or flow rate of the secondary gas flow, e.g. by manually adjusting a valve or pump setting thereby controlling the pressure and/or flow rate of the secondary gas flow, for example the flow of gas emitted by the ring air blade 30.

Figure 2:
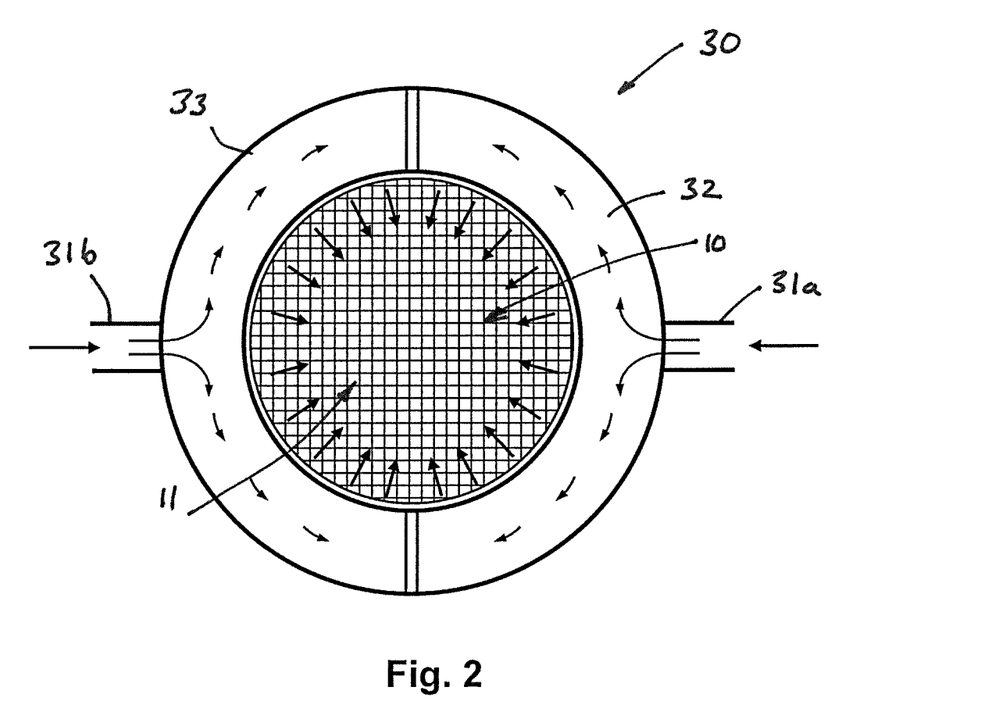
FIG. 2 is a schematic illustration from above of a ring air blade of the apparatus of FIG. 1 and an inlet face of a porous substrate.
Figure 3:
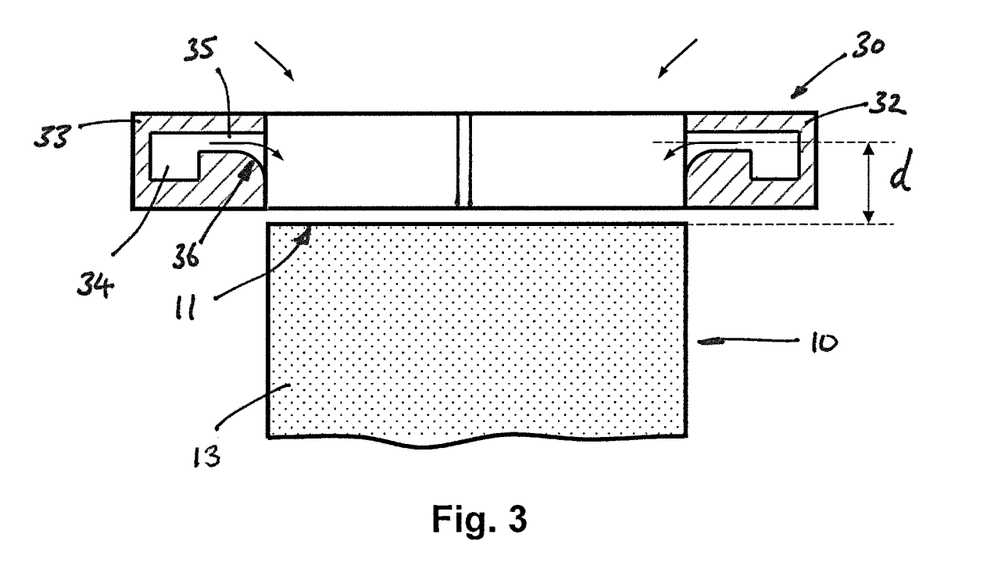
FIG. 3 is a schematic illustration from the side of the ring air blade and porous substrate of FIG. 2.

As shown in FIGS. 2 and 3, the ring air blade 30 may comprise two semi-circular elements 32, 33 that together form a ring shape that extends 360° around the inlet face 11 of the porous substrate 10. Each semi-circular element 32, 33 may have its own gas inlet 31a, 31b that may be supplied from a common gas supply 31.

The ring air blade 30 may have a gas outlet 35 that extends around the inner circumferential wall of each semi-circular element 32, 33 and is orientated generally radially inwards as shown in FIG. 3. Thus, as shown by the arrows in FIG. 2, gas entering each semi-circular element 32, 33 is guided around its element 32, 33 and exits generally radially so that gas is emitted around all or substantially all 360° of the ring air blade 30.

A lower surface 36 of the gas outlet 35 may be rounded to deflect, due to the Coanda effect, gas exiting the gas outlet 35 downwards towards the inlet face 11 as shown in FIG. 3. Thus, a generally conical flow of air may be obtained.

The plane of the gas outlet 35 of the ring air blade 30 may be positioned between 1 and 10 cm above the plane of the inlet face 11 as shown schematically in FIG. 3 using the reference d.

In use, the porous substrate 10 is first located in the holder 2 such that the inlet face 11 is in communication with the inlet chamber 15 and the outlet face 12 is in communication with the vacuum generator, e.g. the vacuum cone 17. The upper and lower inflatable collars 3, 4 may be inflated to secure the porous substrate 10.

Next, a primary gas flow is established through the porous substrate 10 from the inlet face 11 to the outlet face 12 by using the vacuum generator to apply a pressure reduction to the outlet face 12 of the porous substrate 10.

In addition, the ring air blade 30 is activated to generate the secondary gas flow downwards onto the inlet face 11 with the pressure and/or flow rate of the secondary gas flow having been set to a desired level.

The pressure and/or flow rate of the secondary gas flow may be fixed throughout the treatment of a particular porous substrate 10 or may be varied during the treatment of a particular porous substrate 10.

Dry powder is sprayed into or within the inlet chamber 15, e.g. using the spay nozzle 20, such that dry powder is entrained in the primary gas flow, passes along the inlet chamber 15, through the turbulent zone generated by the secondary gas flow, and then passes through the inlet face 11 of the porous substrate 10 to contact the porous structure.

The secondary gas flow may be active for an entire duration of the spraying of the dry powder or a portion of the duration of the spraying of the dry powder.

While in the above examples the secondary air flow has been described as generated by a ring air blade 30, it is within the scope of the present disclosure to use alternative arrangements for generating the secondary air flow onto or across the inlet face 11 to generate a turbulent zone at or above the inlet face 11.

Examples

Figure 4:
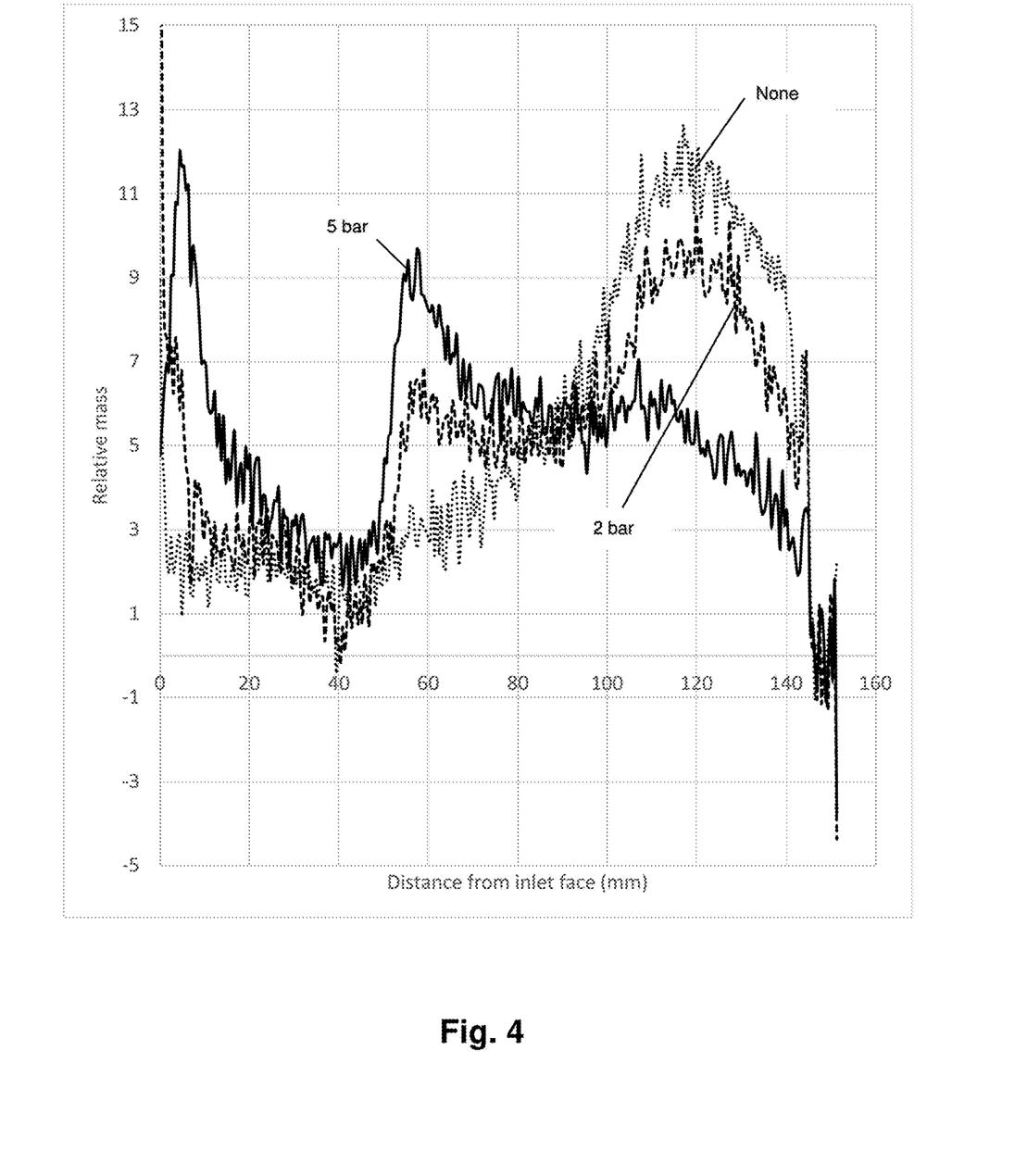
FIG. 4 is a graph showing the relative mass of dry powder deposited against distance from the inlet face for an example porous substrate.

FIG. 4 shows a graph plotting the relative mass of dry powder deposited against distance from the inlet face for samples of a porous substrate.

The porous substrate was an Aluminium Titanate filter substrate supplied by Corning. Diameter=171.9 mm, Length=152.4 mm.

A washcoat was applied to the filter substrate. The washcoat comprised Cu exchanged zeolite (CHA, SAR=18.5, supplied by Tosoh, Cu loading=3.3 wt %) and stabilised gamma alumina (supplied by PIDC) with a 9:1 ratio suspended in water. The washcoat had a d90 of 4-5 μm. The surface of the zeolite was modified using an aminosilane (see US11192793B2).

The washcoat application was according to EP3122458. Washcoat was applied to the outlet end of filter substrate to coat 80% of the filter volume, with a calcined loading of 1.58 g·in$^{-3}$ wrt to the filter volume. Additional washcoat was applied to the inlet end of the filter substrate to coat 35% of the filter volume, with a calcined loading of 0.52 g·in$^{-3}$ wrt to the filter volume. The filter substrate was calcined at 500° C. for 1 hour.

The dry powder was a mixture of Zeolite (a chabazite zeolite with a d90 of 4 μm and SAR of 23, available from Tosoh) and a Silres MK powder (a methyl silicone resin with a d90 of 9 μm, available from Wacker) and was prepared at a 3:1 Zeolite:Silicone resin ratio. The resulting mixed powder was sprayed onto the washcoated filter substrate from the inlet end under a constant flow of air. The air flow forming the primary gas flow was at 300 m$^3$/hr. The coated part was then calcined to 500° C. for 1 hour.

The particle size measurements necessary to obtain d90 of solid particles (e.g., a zeolite or a Silres MK powder) can be obtained by Laser Diffraction Particle Size Analysis using a Malvern Mastersizer 3000, which is a volume-based technique (i.e. d90 may also be referred to as d(v,0.90)) and applies a mathematical Mie theory model to determine a particle size distribution. The laser diffraction system works by determining diameters for the particles based on a spherical approximation. For the particle size measurements by Laser Diffraction Particle Size Analysis, diluted samples were prepared by sonication in distilled water without surfactant for 30 seconds at 35 watts.

A ring air blade 30 was used as the source for the secondary gas flow. The spray nozzle height, h, was fixed at 200 cm throughout. Samples of the filter substrate were treated with the secondary gas flow switched off (marked 'None' on FIG. 4), and with the secondary gas flow at a pressure of 2 bar, 3.5 bar and at 5 bar (the 3.5 bar result is omitted from FIG. 4 merely for clarity).

FIG. 4 is a graph showing the relative mass of dry powder deposited against distance from the inlet face of the filter substrate. The results were obtained by performing an X-ray scan of the filter substrate before and after application of the dry powder. In each scan a measurement of the radial average x-ray absorption was taken every 0.5 mm along the axis of the filter substrate. The pre-application measurements were then subtracted from the post-application measurements and the results then normalised.

As can be seen from FIG. 4, with the secondary gas flow switched off the deposition of the dry powder shows a skew to the outlet end of the filter substrate with a peak around 120 cm from the inlet face. With the secondary gas flow set to 2 bar the otherwise same treatment conditions resulted in an intermediate distribution of the dry powder along the length of the filter structure. With the secondary gas flow set to 5 bar the otherwise same treatment conditions resulted in a deposition of the dry powder showing a skew to the inlet end of the filter substrate with a peak around 5 cm from the inlet face and a secondary peal around 55 cm.

Figure 5:
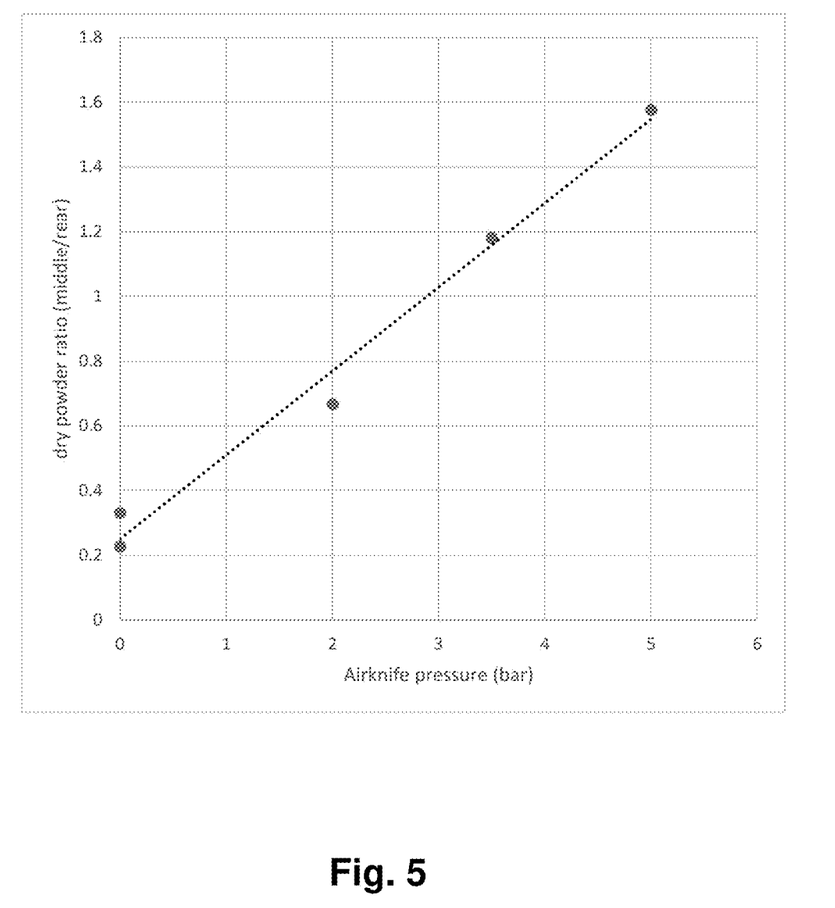
FIG. 5 is a graph showing a powder deposition ratio against secondary gas flow pressure.

FIG. 5 shows a graph of a powder deposition ratio against secondary gas flow pressure for the filter substrates tested as described above at 0, 2, 3.5 and 5 bar pressure for the secondary gas flow pressure. The powder deposition ratio was calculated as the normalised absorption value at 60 mm from the inlet face divided by the normalised absorption value at 120 mm from the inlet face.

As can be seen from FIG. 5, a strong linear relationship was shown between the pressure of the secondary gas flow and the powder deposition ratio showing that use of the secondary gas flow pressure provides a reliable and controllable means for controlling the location of the deposition of the dry powder within the porous substrate.

Figure 6:
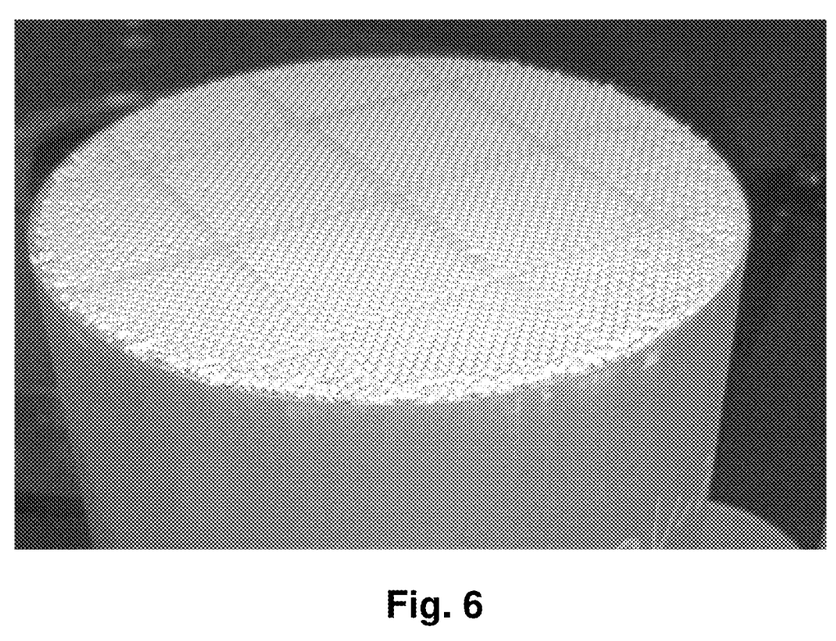
FIG. 6 is a photograph of an inlet face of a porous substrate after spraying of a dry powder.

As shown in FIG. 6, treating the porous substrate 10 with dry powder can result in a build-up of the dry powder on the inlet face 11, in particular on the ends of the walls separating the inlet channels and/or on any channels having their inlet end plugged.

Therefore the ring air blade 30 may be activated to direct a gas flow downwards onto the inlet face 11 to blow off the dry powder accumulated on the inlet face 11 of the porous substrate 10. The vacuum generator may remain active during activation of the ring air blade 30 such that the dry powder blown off the inlet face 11 is entrained in the gas flow and passes through the inlet face 11 of the porous substrate 10.

Figure 7:
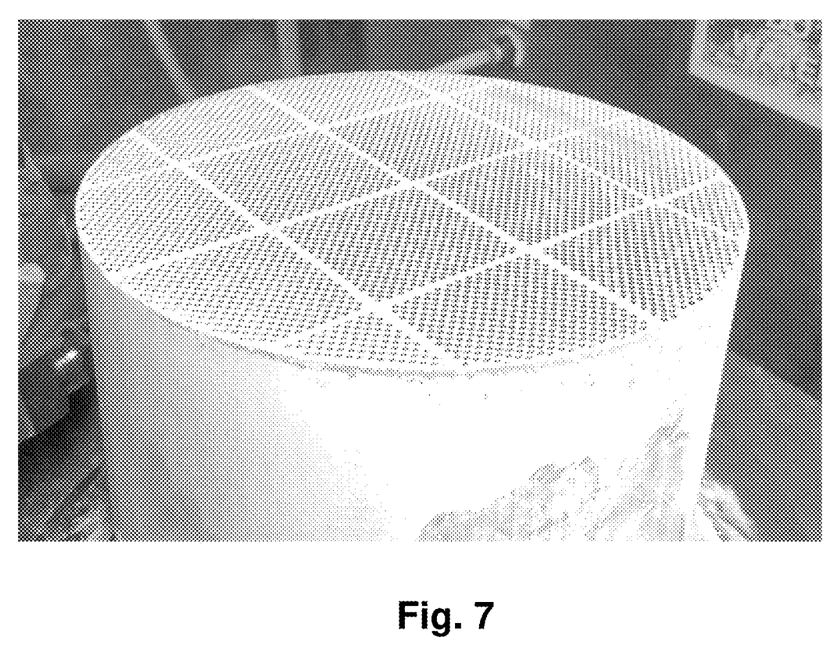
FIG. 7 is a photograph of the porous substrate of FIG. 6 after operation of a ring air blade.

As shown in FIG. 7, the result is that the inlet face 11 may be effectively cleaned of the build-up of dry powder.

The ring air blade 30 may be activated to blow off the dry powder after the spraying of the dry powder into or within the inlet chamber 15 has ceased (but while the vacuum generator is still running). Additionally or alternatively, the ring air blade 30 may be activated during the spraying of the dry powder into or within the inlet chamber 15.

The invention claimed is:

1. A method of applying a dry powder to a porous substrate, the porous substrate having an inlet face at an inlet end and an outlet face at an outlet end with the inlet face and the outlet face being separated by a porous structure, the method comprising the steps of:
   a) locating the porous substrate in a holder such that the inlet face is in communication with an inlet chamber and the outlet face is in communication with a vacuum generator;
   b) establishing a primary gas flow through the porous substrate from the inlet face to the outlet face by using the vacuum generator to apply a pressure reduction to the outlet face of the porous substrate;
   c) spraying the dry powder into or within the inlet chamber such that dry powder is entrained in the primary gas flow and passes through the inlet face of the porous substrate to contact the porous structure;
   d) during the spraying of the dry powder directing a secondary gas flow onto and/or across the inlet face of the porous substrate; and
   e) using a pressure and/or a flow rate of the secondary gas flow to control an axial distribution of the dry powder that is deposited in the porous structure of the porous substrate.

2. The method of claim 1, wherein controlling the axial distribution of the dry powder comprises:
   selecting a relatively high pressure and/or flow rate of the secondary gas flow to skew the axial distribution of the dry powder that is deposited in the porous structure towards the inlet end of the porous substrate;
   selecting a relatively low pressure and/or flow rate of the secondary gas flow or deactivating the secondary gas flow to skew the axial distribution of the dry powder that is deposited in the porous structure towards the outlet end of the porous substrate; and
   selecting a relatively intermediate pressure and/or flow rate of the secondary gas flow to obtain an intermediate axial distribution of the dry powder that is deposited in the porous structure.

3. The method of claim 1, wherein the secondary gas flow is active for:
   an entire duration of the spraying of the dry powder; or
   a portion of the duration of the spraying of the dry powder.

4. The method of claim 1, wherein the secondary gas flow remains active or is activated after the spraying of the dry powder has ceased in order to blow off dry powder accumulated on the inlet face of the porous substrate.

5. The method of claim 4, wherein the vacuum generator remains active during activation of the secondary gas flow after cessation of spraying of the dry powder such that the dry powder blown off the inlet face is entrained in the primary gas flow and passes through the inlet face of the porous substrate.

6. The method of claim 1, wherein the secondary gas flow is configured to be a 360° or substantially 360° flow of gas.

7. The method of claim 1, wherein the secondary gas flow is configured to be directed at a downwards angle onto the inlet face.

8. The method of claim 1, further comprising using a ring air blade to generate the secondary gas flow.

9. The method of claim 1, wherein the dry powder is sprayed into or within the inlet chamber using a spray nozzle, and when using the pressure and/or the flow rate of the secondary gas flow to control the axial distribution of the dry powder, a spatial separation of the spray nozzle from the inlet face remains fixed.

10. The method of claim 1, further comprising applying dry powder successively to a plurality of porous substrates, wherein for each of the plurality of porous substrates the pressure and/or flow rate of the secondary gas flow is selected in order to control the axial distribution of the dry powder that is deposited in the porous structure of that porous substrate.

11. The method of claim 10, wherein a spatial separation of a spray nozzle for spraying the dry powder and the inlet face of the plurality of porous substrates remains fixed.

* * * * *